United States Patent [19]

Taniguchi et al.

[11] Patent Number: 4,947,533
[45] Date of Patent: Aug. 14, 1990

[54] MANUFACTURING METHOD OF DISK FOR BELT-DRIVEN CONTINUOUSLY-VARIABLE-SPEED DRIVE

[75] Inventors: Katuhiko Taniguchi; Akiharu Nakajima, both of Hamamatsu; Osamu Kondo, Kosai, all of Japan

[73] Assignee: Suzuki Jidosha Kogyo Kabushiki Kaisha, Shizuoka, Japan

[21] Appl. No.: 351,018

[22] Filed: May 12, 1989

[30] Foreign Application Priority Data

Jul. 14, 1988 [JP] Japan ................... 63-176140

[51] Int. Cl.$^5$ ............................................... B21K 1/42
[52] U.S. Cl. ........................................ 29/894; 474/188; 474/8; 82/1.11
[58] Field of Search ................... 29/159 R; 474/8, 189, 474/188; 51/281, 323

[56] References Cited

U.S. PATENT DOCUMENTS

| 2,187,188 | 1/1940 | Whitcomb | 474/8 |
| 2,892,354 | 6/1959 | Amonsen | 474/8 |
| 4,754,908 | 7/1988 | Tanaka et al. | 72/368 |

FOREIGN PATENT DOCUMENTS 60-109661  6/1985  Japan .
62-184270  8/1987  Japan .

*Primary Examiner*—P. W. Echols
*Attorney, Agent, or Firm*—Flynn, Thiel, Boutell & Tanis

[57] ABSTRACT

A method for manufacturing a disk for a belt-driven continuously-variable-speed drive of the type which includes a metal belt disposed in engagement between mutually facing sheave surfaces which form a V-groove, including the steps of machining each sheave surface with a numerical control lathe to form therein a spiral groove that is centered about the center of the pulley and has a surface roughness within the range of 0.8–0.4 microns, and thereafter super finishing the sheave surfaces to produce residual stress therein.

4 Claims, 4 Drawing Sheets

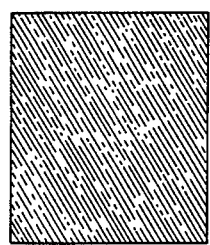
FIG.5 (b)
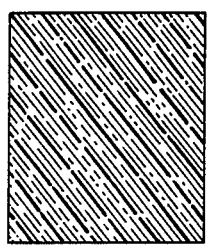
FIG.6 (b)
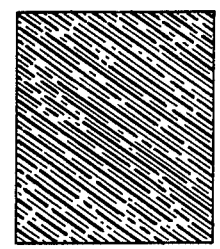
FIG.7 (b)
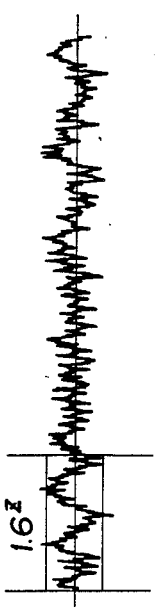
FIG.5 (a) VER.×10000 HOR.×10
FIG.6 (a) VER.×10000 HOR.×10  1.6²
FIG.7 (a) VER.×1000 HOR.×1000

MANUFACTURING METHOD OF DISK FOR BELT-DRIVEN CONTINUOUSLY-VARIABLE-SPEED DRIVE

FIELD OF THE INVENTION

The invention relates to a method of manufacturing a disk for a belt-driven continuously-variable-speed drive, especially to a method of manufacturing a belt-driven continuously-variable-speed drive disk having a sheave surface contacting a metallic belt.

BACKGROUND OF THE INVENTION

Vehicles are equipped with a variable-speed drive or transmission between the internal combustion engine and the driving wheel. The variable-speed drive changes the driving-wheel force and vehicle speed according to the vehicle traveling condition which often changes.

The variable-speed drive operates to change the belt ratio by changing the width of the groove of a pulley which includes a first pulley piece (disk) fixed to a rotating shaft and a second pulley piece (disk) installed on the rotating shaft so that it can be axially contacted with or separated from the first pulley piece through hydraulic pressure to change the engagement radius of the belt and the corresponding transfer of power.

The above type of continuously-variable-speed drive is disclosed in Japanese Publication No. 109661/85. The pulley piece or disk of the drive disclosed in the above publication has convexities and concavities of a size of 20 microns or larger formed on the disk surface to lengthen the service life by keeping the ratio of flat area to convex tip area at 20-70% and to improve the dimensional accuracy of the belt-driven continuously-variable-speed drive.

Another type of continuously-variable-speed drive is disclosed in Japanese Publication No. 184270/87. The drive disclosed in this publication is designed so that belts will intersect a V-groove of a block in which are formed several grooves with approximately the same width to adjust the friction between the block and pulley.

In the existing method of manufacturing the disk for a belt-driven continuously-variable-speed drive, the surface of the disks holding the metallic belt are made of blister steel and are precisely ground to finish the surfaces. However, when the tapered sheave surface of the disk is ground, there is the disadvantage that the equipment cost increases because a large and special grinder is needed to precisely maintain the surface configuration. Also, the grooves on the surface become shallow, and irregular swells are produced due to variations in the quality of the dressing of the grinding wheel.

Another disadvantage is that, because a friction drive system, unlike the so-called traction drive, is applied between the sheave surface of the disk and the belt, the existing manufacturing method can not be practically used since it is necessary to use a cooling oil which must then be removed to prevent the surface from being coated with an unnecessary oil film.

The purposes of the invention include providing a method of manufacturing economical disks for a belt-driven continuously-variable-speed drive capable of keeping the oil condition on the sheave surface of the pulley constant, generating compressed residual stress on the sheave surface, improving the fatigue strength of the disks, and decreasing the machining cost by forming a spiral groove with a surface roughness (i.e. height) of approximately 0.8-0.4 microns on the sheave surface of the disk by using a numerical control (NC) lathe and then grinding the sheave surface through super finishing in order to eliminate the above disadvantages.

SUMMARY OF THE INVENTION

To accomplish the above and other purposes, the invention provides a method of manufacturing a disk for belt-driven continuously-variable-speed drive which controls speed by changing the V-groove width of a pulley having two disks with tapered sheave surfaces to thereby change the radius of engagement with a metallic belt, thus causing a change in the belt ratio. In the inventive process, the sheave surfaces which contact the metallic belt are machined by a numerical control lathe to form thereon a spiral a groove with a surface roughness of 0.8-0.4 microns and generally centered above an axis of rotation of the pulley. Then the sheave surfaces are ground through super finishing to generate residual stress.

As above mentioned, the invention makes it possible to keep the oil condition on the sheave surface of the pulley constant, generate compressed residual stress on the sheave surface, improve the fatigue strength, and decrease the machining cost.

DETAILED DESCRIPTION

Figure 1:
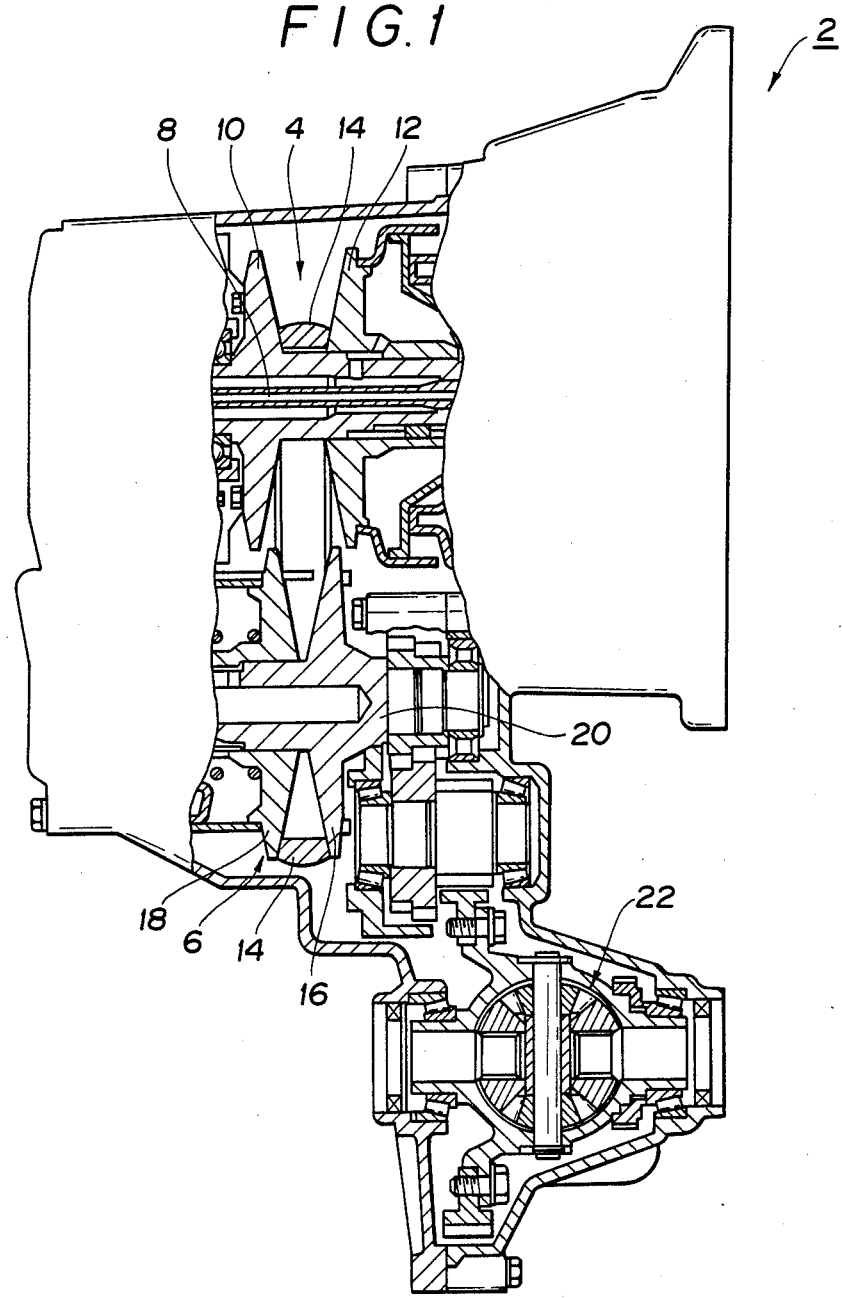
FIG. 1 is a partially broken side view of a belt-driven continuously-variable-speed drive according to the invention.
Figure 2:
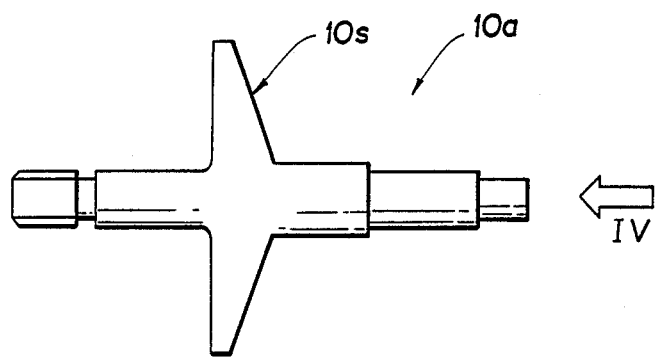
FIG. 2 is an enlarged view of the fixed pulley piece of FIG. 1.
Figure 3:
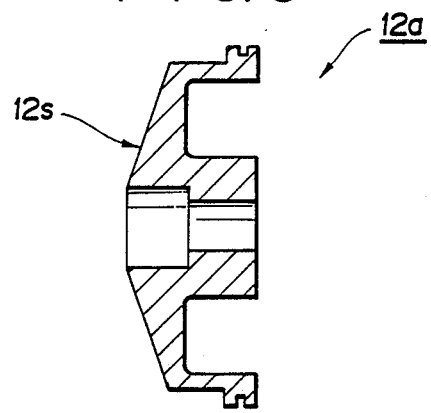
FIG. 3 is an enlarged cross-sectional view of the movable pulley piece of FIG. 1.
Figure 4:
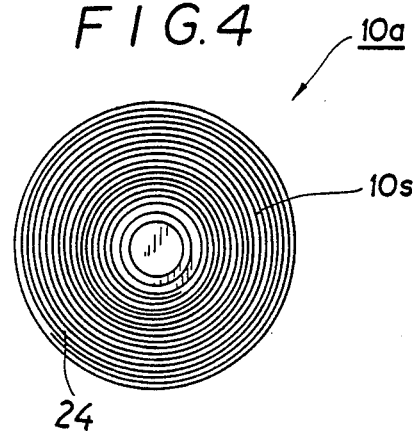
FIG. 4 is a view of the pulley piece from the direction indicated by the arrow IV in FIG. 2.
Figure 5:
FIG. 5(a) is a graph showing the data for sheave surface roughness through grinding.
FIG. 5(b) is an enlarged view of the sheave surface corresponding to the graph of FIG. 5(a).
FIG. 5(c) is a rough graph of data.
Figure 6:
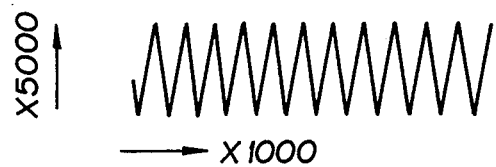
FIG. 6(a) is a graph showing the data for sheave surface roughness made by an numerical control lathe.
FIG. 6(b) is an enlarged view of the sheave surface corresponding to the graph of FIG. 6(a).
FIG. 6(c) is a rough graph of data.
Figure 7:
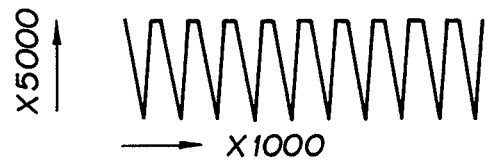
FIG. 7(a) is a graph showing the data for sheave surface roughness through super finishing.
FIG. 7(b) is an enlarged view of the sheave surface corresponding to the graph of FIG. 7(a).
FIG. 7(c) is a rough graph of data.

FIGS. 1 through 8 show a preferred example of the invention. In FIG. 1, the reference numeral 2 represents a belt-driven continuously-variable-speed drive, 4 a driving pulley, and 6 a driven pulley.

The driving pulley 4 is installed on an input shaft 8 which is a driving shaft of the continuously-variable-speed drive 2. The driving pulley 4 consists of an axially fixed driving pulley piece 10 and an axially movable driving pulley piece 12.

A metallic belt 14 is installed to connect the driving pulley 4 and driven pulley 6.

An output shaft 20 equipped with an axially fixed pulley piece 16 and an axially movable pulley piece 18 of the driven pulley 6 is connected to a final speed reducer 22.

The driving pulley 4, for example, consists of two disks 10a and 12a (FIGS. 2 and 3) which correspond to the fixed driving pulley piece 10 and the movable driving pulley piece 12, respectively. The metallic belt 14 contact sheave surfaces 10s and 12s of these disks 10a and 12a, which surfaces are of a generally truncated conical configuration to define a V-groove therebetween.

A spiral groove 24 is formed, for example, on the sheave surface 10s of the disk 10a (FIG. 4) using a numerical control (NC) lathe (not illustrated). The surface roughness (i.e. height) of the spiral groove 24 is set to approximately 0.6 microns.

For super finishing, the sheave surface 10s of the disk 10a is ground through lapping to generate residual stress therein.

The spiral surface 10s of groove 24 (though not illustrated) is formed not only on the disk 10a but also on the sheave surface 12s of the disk 12a. The sheave surface 12s is also ground through lapping. In this case, for lapping, the sheave surface 12s is ground by a grinding tool (not illustrated) with a configuration suitable for the sheave surface 10s of the disk 10a installed on the grinder (not illustrated).

In forming the sheave surface 10s of the disk 10a with the conventional existing grinding technique, surface roughness of the sheave surface 10s is as depicted by the data shown in FIG. 5(a). The sheave surface 10s is shown enlarged to a magnification of approximately 70 times in FIG. 5(b). The above data is graphically shown in FIG. 5(c). From FIG. 5(c) it is found that data variation or surface roughness is large.

Figure 8:
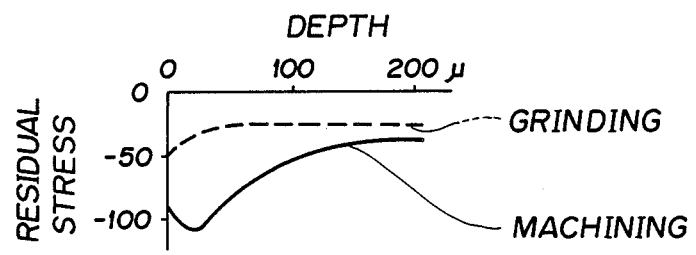
FIG. 8 is a graph showing the relationship between depth and residual stress on a sheave surface for grinding and machining processes.

As the result of grinding the sheave surface 10s with the existing grinding technique, it is found that compressed residual stress is generated as shown by the broken line in FIG. 8.

In the execution of the example of this application, however, the spiral groove 24 is formed on the sheave surface 10s of the disk 10a, provided with carburization quenching/tempering, by a numerical control lathe. The surface roughness of the sheave surface 10s is depicted by the data shown in FIG. 6(a). The sheave surface 10s is shown enlarged to a magnification of approximately 70 times in FIG. 6(b). The above data is graphically shown in FIG. 6(c). From FIG. 6(c), it is found that the surface roughness is stable or data variation is small.

Then, when the super finishing (e.g., lapping) is applied to the sheave surface 10s of the disk 10a to remove fine burrs and layer deterioration due to machining from the end of the spiral groove 24, after the surface is machined with the above grinding tool, the surface roughness of the sheave surface 10s is as depicted by the data shown in FIG. 7(a). The sheave surface 10s is shown enlarged to a magnification of approximately 70 times in FIG. 7(b).

The above data is graphically shown in FIG. 7(c). From FIG. 7(c), it is found that the surface roughness after removing fine burrs and layer deterioration due to machining is stable and data variation is small. Therefore, it is possible to generate larger compressed residual stress compared with the existing technology. Thus, the disk of the invention is practically advantageous because the condition of the oil on the sheave surfaces 10s and 12s of the disks 10a and 12a can be held constant with the uniform spiral groove formed on the sheave surfaces 10s and 12s of the disks 10a and 12a.

In addition, as the result of machining the sheave surfaces 10s and 12s of the disks 10a and 12a and then applying lapping to them, it is possible to generate a larger compressed residual stress than that generated by the existing grinding technique, as shown by the solid line in FIG. 8 on the sheave surfaces 10s and 12s. The fatigue strength of the disks 10a and 12a is also improved. Moreover, the method of the invention is economically advantageous because the equipment cost can be decreased since no large special grinder is needed to form the disks 10a and 12a.

Besides, the method of the invention is practically advantageous because the operability of the procedure for forming the spiral groove 24 is improved in that the spiral groove 24 can be easily formed on the sheave surfaces 10s and 12s of the disks 10a and 12a.

As above mentioned in detail, the method of the invention is practically advantageous because the oil condition can be kept constant with the uniform groove formed on the disk sheave surface by the process disclosed above. The spiral groove is formed with a surface roughness of 0.8–0.4 microns using a numerical control lathe. The disk sheave surface is then ground through super finishing to generate residual stress for the disk.

In addition, the fatigue strength is improved because it is possible to generate compressed residual stress on the sheave surface larger than that produced by the existing grinding technique by first machining the sheave surface and then applying super finishing to it.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method of manufacturing a disk for a belt-driven continuously-variable-speed drive which controls speed by changing the V-groove width of a pulley consisting of two said disks with opposed tapered sheave surfaces to thereby change the radius of engagement with a metallic belt to change the drive ratio, comprising the steps of: machining the sheave surfaces contacting the metallic belt with a numerical control lathe to form a groove therein which is generally centered about an axis of rotation of the pulley, said groove having a height within a range of 0.8–0.4 microns, and then super finishing the sheave surfaces to generate residual stress on said sheave surfaces.

2. A method according to claim 1, wherein said groove spirals radially outwardly about said radius.

3. A method according to claim 2, wherein said super finishing involves grinding said surfaces by lapping.

4. A method according to claim 2, wherein the groove makes several revolutions about the axis of rotation.

* * * * *